(12) United States Patent
Gehret et al.

(10) Patent No.: US 9,943,916 B2
(45) Date of Patent: *Apr. 17, 2018

(54) CHOP SAW WITH IMPROVED STORAGE MODE

(71) Applicant: Black & Decker Inc., New Britain, CT (US)

(72) Inventors: Robert S. Gehret, Hampstead, MD (US); Christian V. Elder, Baltimore, MD (US); Jason F. Busschaert, Bel Air, MD (US); Craig A. Schell, Street, MD (US)

(73) Assignee: Black & Decker Inc., New Britain, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/014,316

(22) Filed: Feb. 3, 2016

(65) Prior Publication Data

US 2016/0263669 A1    Sep. 15, 2016

Related U.S. Application Data

(63) Continuation of application No. 13/790,173, filed on Mar. 8, 2013, now Pat. No. 9,283,628.

(51) Int. Cl.
*B23D 45/04* (2006.01)
*B27B 5/29* (2006.01)

(52) U.S. Cl.
CPC .............. *B23D 45/044* (2013.01); *B27B 5/29* (2013.01); *Y10T 83/7697* (2015.04)

(58) Field of Classification Search
CPC .... B23D 45/044; B23D 47/02; B23D 45/042; B23D 47/04; B23D 47/00; B26D 1/01; B26D 1/14; B27B 27/00; B27B 27/08
USPC ........ 83/471.3, 468.7, 477, 471, 581, 477.1, 83/859, 574, 473, 701
See application file for complete search history.

(56) References Cited

U.S. PATENT DOCUMENTS

| | | | | |
|---|---|---|---|---|
| 3,302,669 A * | 2/1967 | Edler | ................... | B23D 47/025 83/471.3 |
| 3,465,793 A * | 9/1969 | Zuk | ........................ | B27B 5/165 83/477.1 |
| 3,586,079 A * | 6/1971 | Collins, Sr. | ........ | B23D 57/0076 144/35.1 |
| 4,211,134 A * | 7/1980 | Thorsell | ............... | B23D 59/005 83/468.3 |
| 4,405,003 A * | 9/1983 | Watson | ................ | B25H 1/0042 144/286.1 |
| 4,523,504 A * | 6/1985 | Alessio | .............. | B23D 57/0092 144/48.3 |
| 4,587,875 A * | 5/1986 | Deley | ................. | B23D 45/024 83/471.3 |

(Continued)

*Primary Examiner* — Ghassem Alie
(74) *Attorney, Agent, or Firm* — Adan Ayala

(57) ABSTRACT

A chop saw includes a base assembly and a saw assembly pivotally attached to the base assembly. The base assembly has a workpiece-supporting plane. The saw assembly has a blade and a motor driving the blade. A hinged connection between the base assembly and a saw assembly allows a user to rotate the saw assembly from a position where the plane of the blade extends through the workpiece-supporting plane to a position where the plane of the blade does not extend through the workpiece-supporting plane. In such position, the plane of blade may be substantially parallel to the workpiece-supporting plane.

10 Claims, 12 Drawing Sheets

(56) References Cited

U.S. PATENT DOCUMENTS

| | | | | |
|---|---|---|---|---|
| 5,193,595 A | * | 3/1993 | Johnson | B23D 45/025 144/1.1 |
| 6,810,780 B2 | * | 11/2004 | Ceroll | B23D 45/048 83/471.3 |
| 7,387,056 B2 | * | 6/2008 | Higuchi | B23D 45/027 83/483 |
| 7,997,177 B2 | * | 8/2011 | Ushiwata | B23D 45/027 83/471.3 |

\* cited by examiner

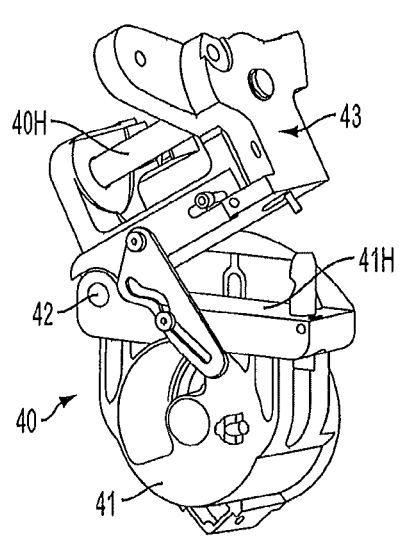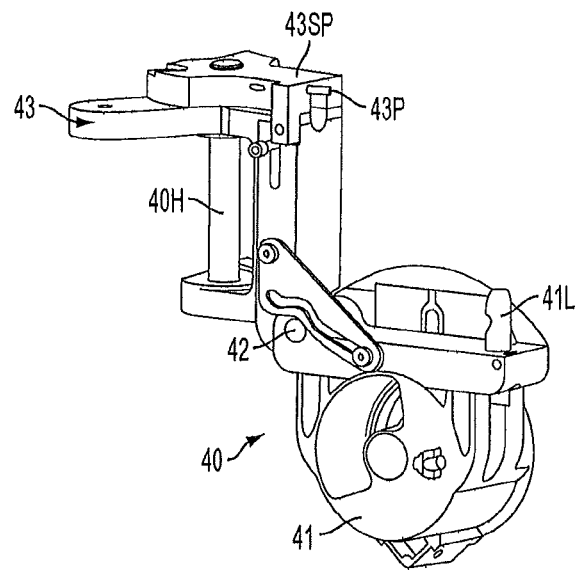
FIG. 5E          FIG. 5F
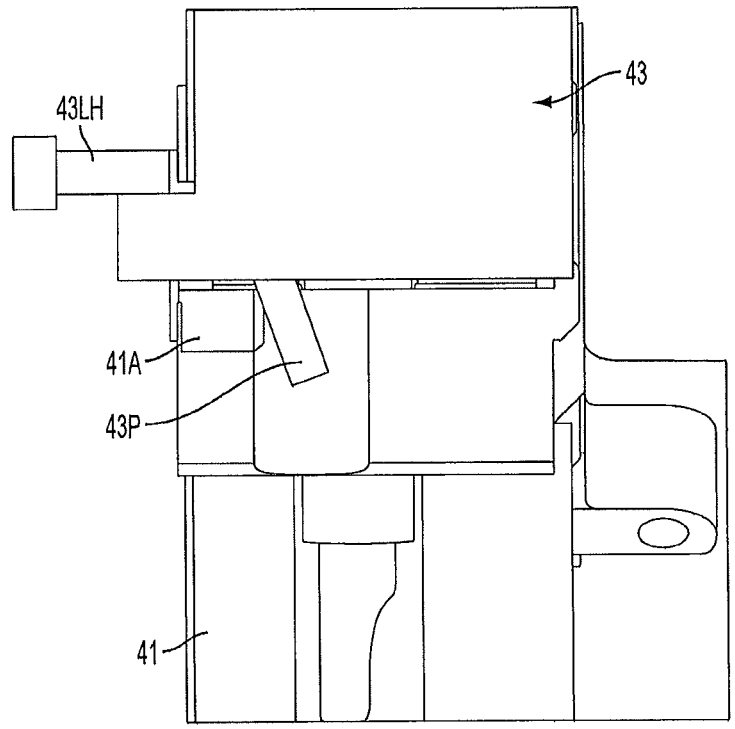
FIG. 8E

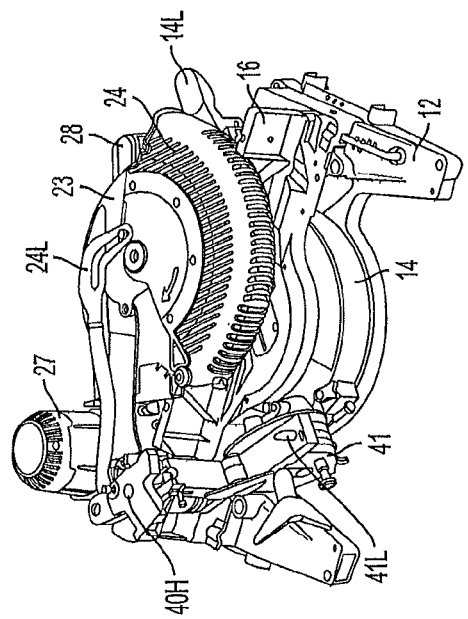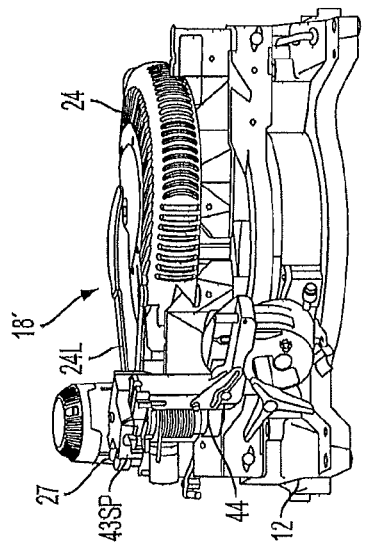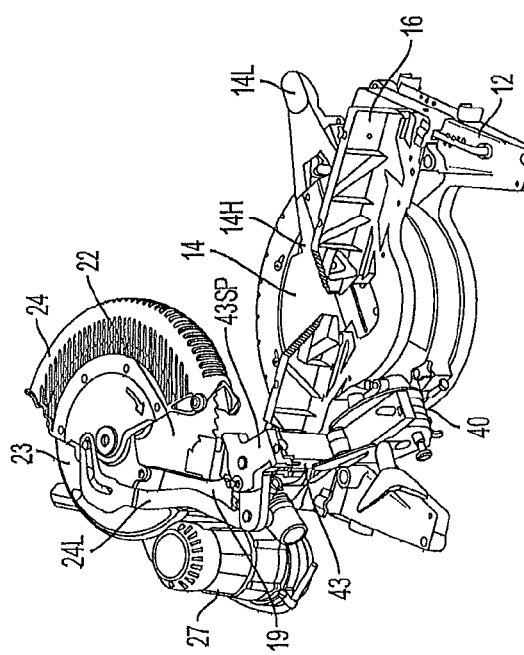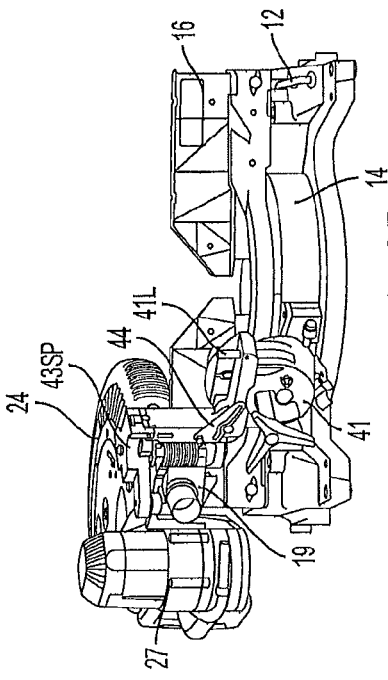
FIG. 9D
FIG. 9E
FIG. 9A
FIG. 9B

US 9,943,916 B2

CHOP SAW WITH IMPROVED STORAGE MODE

FIELD OF THE INVENTION

The present invention relates to chop saws, and in particular, to a chop saw with an improved storage mode.

BACKGROUND

Chop saws and miter saws are commonly found on jobsites because of their versatility and ability to make cuts that other power tools cannot make quickly. Typically a chop saw has a base assembly and a saw assembly attached to the base that can be lowered into a cutting position. One such chop saw illustrated in U.S. Pat. No. 6,272,960, which is fully incorporated herein by reference.

A miter saw is a chop saw that has a rotatable table in its base assembly for allowing miter cuts. Some miter saws, such as the one illustrated in U.S. Pat. No. 5,297,463, which is fully incorporated herein by reference, have a beveling saw assembly, which allows bevel cuts, i.e., inclined cuts relative to the workpiece-supporting plane of the base assembly and/or table. In addition, in some miter saws, the saw assembly may beveled rightwardly and leftwardly from a zero-bevel position, i.e., 90 degrees relative to the workpiece-supporting plane. One such chop saw illustrated in U.S. Pat. No. 7,252,027, which is fully incorporated herein by reference.

Referring to FIGS. 1-3, the chop saw 10 has a base assembly 12, which includes a rotatable table 14. A fence assembly 16 is connected to base assembly 12.

Saw assembly 18 is pivotally attached to table 14. Saw assembly 18 includes a trunnion 17 which is rotatably connected to table 14. Trunnion 17 carries a hinge 17H. A pivot arm 19 is pivotably attached to hinge 17H. Pivot arm 19 supports a motor 27 in a housing 27H. Motor 27 is operably connected to a blade 22 for driving blade 22. A transmission 29 may connect motor 27 to blade 22.

An upper portion of blade 22 may be covered by an upper guard 23, which is supported by pivot arm 19. A movable lower guard 24 may be rotatably attached to upper guard 23. Lower guard 24 covers a lower portion of blade 22 until the pivot arm 19 (and thus saw assembly 18) is moved downwardly in a chopping action. A linkage (not shown) moves lower guard 24 to expose the lower portion of blade 22 for cutting a workplace.

Chop saw 10 has a handle 28 for lowering pivot arm 19 (and thus saw assembly 18) in the chopping action. In addition, chop saw 10 may have a carrying handle 26.

One problem with prior art chop saws is that they may be unwieldy to carry. Users tend to carry them by holding the base assembly 12 with both hands (FIG. 1), or carrying them by the carrying handle 26 (FIG. 2). Because of the typical placement of components, when carrying chop saw 10 by the carrying handle 26, the center of gravity CG tends to be misaligned and not directly underneath carrying handle 26 and/or the workpiece-supporting plane of base assembly 12 and/or table 14 is inclined, rather than substantially horizontal or substantially vertical.

Prior art chop saws tend to have a bulky envelope. Even when chop saw 10 is in its most compact form, a chop saw that carries a 12 inch (304.8 mm) blade would require a 660 mm×570 mm×385 mm (144,837 cubic centimeters) package 10P or larger (FIG. 3). Similarly, a chop saw that carries a 10 inch (254 mm) blade would require a 550 mm×475 mm×321 mm (83,861 cubic centimeters) package or larger.

BRIEF DESCRIPTION OF THE DRAWINGS

FIGS. 5A-5F illustrate the opening of the top trunnion hinge, where FIG. 5A and FIG. 5F are perspective views of the beginning and end of the opening process, respectively, and FIGS. 5B-6E are perspective views of the intermediate steps therebetween.

FIGS. 6A-6B are partial perspective views of the latch mechanism in the latched and unlatched positions, respectively.

FIGS. 7A-7B are partial perspective views of the arm interlock mechanism in the enabled position showing the latch in unlocked and locked positions, respectively.

FIGS. 8A-8E illustrate the closing of the top trunnion hinge, where FIG. 8A and FIG. 8D are partial cross-sectional views illustrating the beginning and end of the closing process, respectively, FIGS. 8B-8C are partial cross-sectional views illustrating the intermediate steps therebetween, and FIG. 8E is a partial cross-sectional view of the top trunnion hinge.

FIGS. 9A-9F illustrate the chop saw with the opened top trunnion hinge with the saw assembly in the unlatched and latched positions, where FIGS. 9A-9C are perspective, rear and front views, respectively, of the chop saw with the opened top trunnion hinge with the saw assembly in the unlatched position, and FIGS. 9D-9F are perspective, rear and front views, respectively, of the chop saw with the opened top trunnion hinge with the saw assembly in the latched position.

FIGS. 10A-10B are partial perspective views of the chop saw with a storage latch assembly in the unlatched and latched positions, respectively, FIG. 10C is a perspective view of the storage latch assembly, and FIG. 10D is an exploded view of the storage latch assembly.

DESCRIPTION

Figure 1:
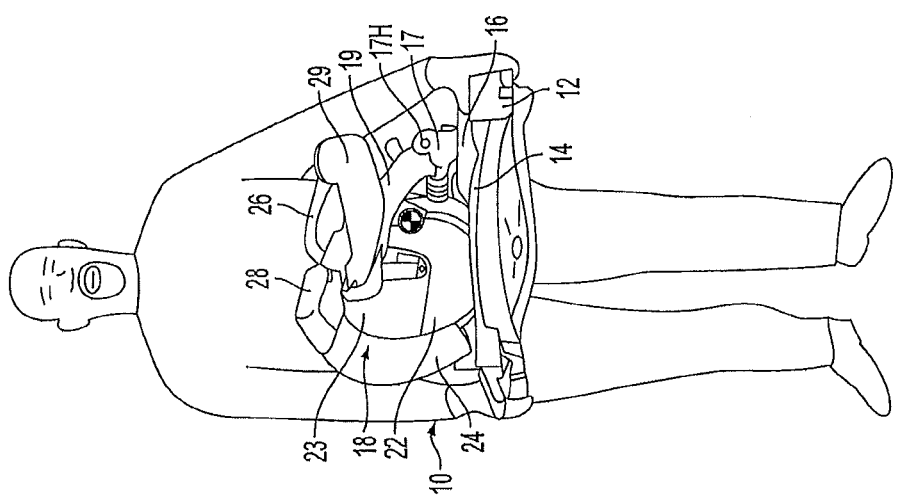
FIG. 1 is a front view of a user transporting a prior art chop saw.
Figure 2:
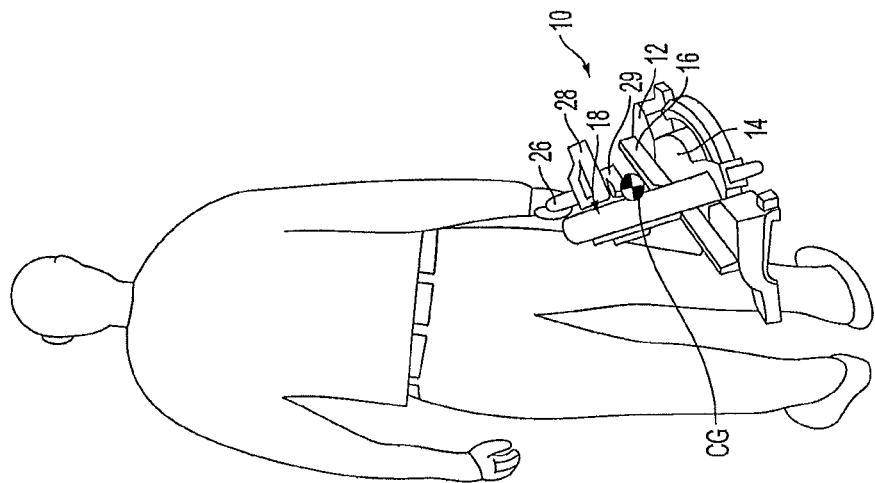
FIG. 2 is a rear view of a user transporting the prior art chop saw of FIG. 1 in another orientation.

FIGS. 4A-4D illustrates a chop saw 100 according to the invention, where like numerals refer to like parts. Chop saw 100, has a base assembly 12, which may include a rotatable table 14. A fence assembly 16 is connected to base assembly 12.

Saw assembly 18' is preferably pivotally attached to table 14. Saw assembly 18' includes a trunnion 40 which is preferably rotatably connected to table 14. Trunnion 40 carries a hinge 40H. A pivot arm 19 is pivotally attached to hinge 40H. Pivot arm 19 may support a motor 27 in a housing 27H. Motor 27 may be operably connected to a blade 22 for driving blade 22. A transmission 29 may connect motor 27 to blade 22.

An upper portion of blade 22 may be covered by an upper guard 23, which is preferably supported by pivot arm 19. A movable lower guard 24 may be rotatably attached to upper guard 23. Lower guard 24 covers a lower portion of blade 22 until the pivot arm 19 (and thus saw assembly 18') is moved downwardly in a chopping action. A linkage (not shown) moves lower guard 24 to expose the lower portion of blade 22 for cutting a workpiece.

Chop saw 10 has a handle 28 for lowering pivot arm 19 (and thus saw assembly 18') in the chopping action. In addition, chop saw 10 may have a carrying handle 26.

With such arrangement, the user can change the cutting plane, i.e., the plane of blade 22, relative to the plane of fence assembly 16 by rotating table 14 (and thus saw assembly 18') relative to base assembly 12, i.e., mitering the saw assembly 18'. The user can fix the rotational position of table 14 by engaging a miter lock assembly 14L, which is well known in the art.

The user may also change the cutting plane relative to the workpiece-supporting plane of base assembly 12 and/or table 14 by rotating the trunnion 40 (and thus saw assembly 18') relative to table 14, i.e., beveling the saw assembly 18'. The user can fix the rotational position of trunnion 40 by engaging a bevel lock assembly 40L, which is well known in the art.

Referring to FIGS. 5A-5F (where pivot arm 19, bevel lock assembly 40L, table 14 and other components have been removed to allow better view of the remaining components), trunnion 40 has a trunnion body 41 with a top trunnion hinge 42. A top trunnion 43 is pivotally attached to top trunnion hinge 42. Preferably trunnion body 41 has a substantially horizontal surface 41H which supports top trunnion 43. Top trunnion 43 in turn carries hinge 40H.

Top trunnion 43 can be rotated relative to trunnion body 41 about top trunnion hinge 42. This would allow a user to rotate saw assembly 18' from a position where the plane of blade 22 extends through table 14 for cutting (as shown in FIGS. 4A-4D) to a position where the plane of blade 22 does not extend through table 14 (as shown in FIGS. 9A-9F). Persons skilled in the art will recognize that, in such position, the plane of blade is substantially parallel to the workpiece-supporting plane of base assembly 12 and/or table 14.

Persons skilled in the art will recognize that top trunnion 43 will rotate about an axis 42A that is preferably on a parallel plane to the workpiece-supporting plane of base assembly 12 and/or table 14. Axis 42A may also be substantially perpendicular to the axis 40A of hinge 40H, and substantially parallel to the bevel axis 40B.

A plate 44 may be used to limit the travel range of top trunnion 43 relative to trunnion body 41. Referring to FIGS. 5A-5F, plate 44 may be pivotally attached to top trunnion 43 via a fastener 43F. Plate 44 preferably has a slot 44S through which a fastener 41F on trunnion body 41 extends therethrough. With such arrangement, top trunnion 43 can rotate open about hinge 42 and stop when fastener 41F reaches the end of slot 44S.

Figure 6A:
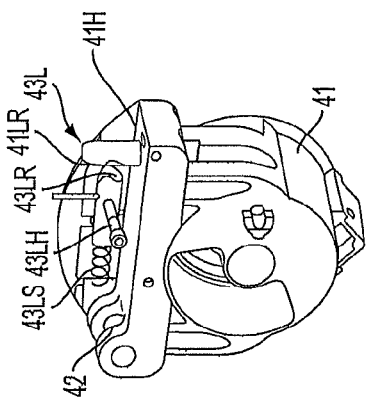
FIGS. 6A-6B illustrate a latch mechanism in the top trunnion hinge, where
Figure 6B:
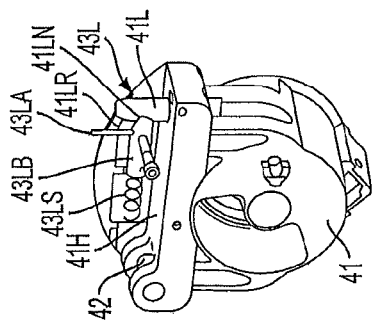

FIGS. 5-6 show the locking mechanism 43L used for maintaining top trunnion 43 in the closed position. Persons skilled in the art will recognize that top trunnion 43 has been removed in FIGS. 6A-6B to better illustrate the locking mechanism 43L. Locking mechanism 43L includes a bolt 43LB that may be slidably disposed within top trunnion 43. Bolt 43LB preferably has a handle 43LH to allow a user to move bolt 43LB from a latched position (shown in FIG. 6A) to an unlatched position (shown in FIG. 6B).

Bolt 43LB preferably engages a latch post 41L and in particular a notch 41LN thereon. A spring 43LS disposed within top trunnion 43 preferably biases bolt 43LB towards the latched position. Preferably bolt 43LB has a ramp 43LR that can contact a ramp 41LR disposed on the latch post 41L so that, as top trunnion 43 is moved towards the closed position of FIG. 5A, bolt 43LB can moved towards the unlatched position as ramp 43LR moves along ramp 41LR, then snap towards the latched position because of the force provided by spring 43LS.

Figure 7A:
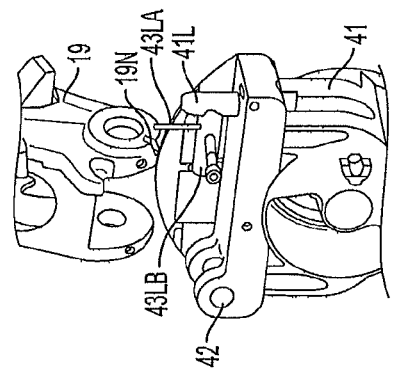
FIGS. 7A-7B illustrate an arm interlock mechanism, where
Figure 7B:
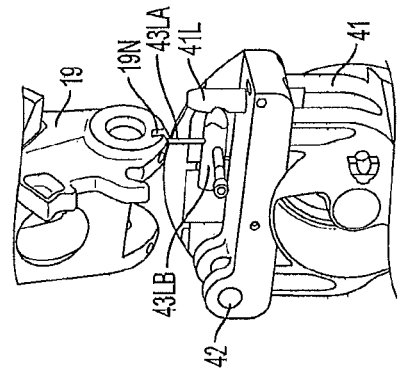
Figure 7C:
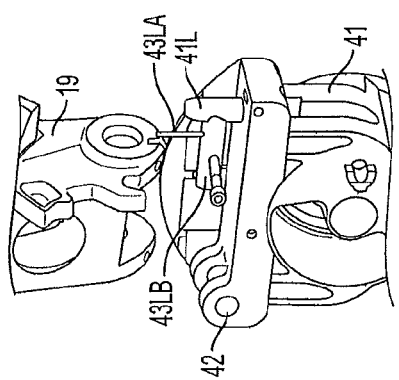
FIG. 7C is a partial perspective view of the arm interlock mechanism in a blocked position.
Figure 8A:
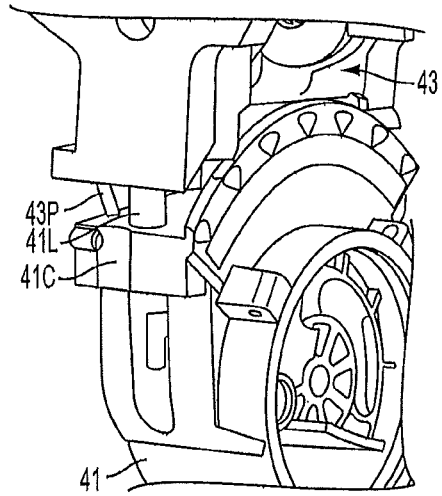
Figure 8B:
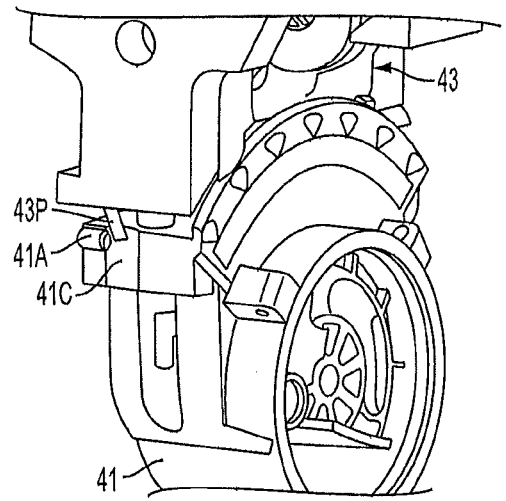
Figure 8C:
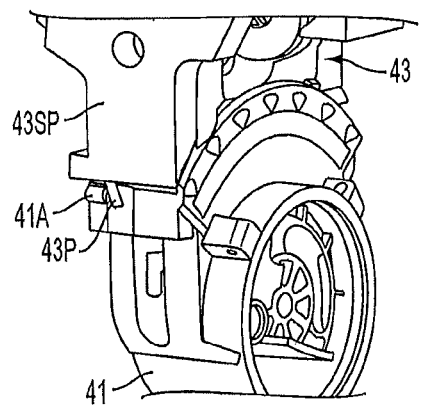
Figure 8D:
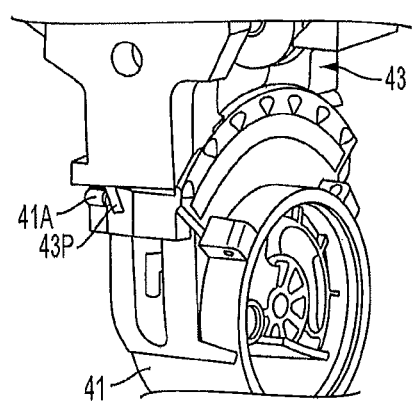

Referring to FIGS. 6-7, locking mechanism 43L may also have an interlock mechanism for locking arm 19 to avoid a downward (i.e., chopping) motion when bolt 43LB is moved towards the unlatched position. In particular, this means could be an arm lock 43LA extending from bolt 43LB. When bolt 43LB is moved to the unlatched position, arm lock 43LA slides into a notch 19N in arm 19 (as shown in FIG. 7B), preventing the rotation of arm 19 about hinge 40H Persons skilled in the art will recognize that when bolt 43LB is in the latched position, arm 19 is able to rotate about hinge 40H as arm lock 43LA is not in notch 19N (as shown in FIG. 7A). Preferably, if the user rotates arm 19 downwardly, the user will not be able to unlatch bolt 43LB as arm lock 43LA will not be able to enter notch 19N, as shown in FIG. 7C.

Referring to FIGS. 5A-8E, top trunnion 43 may have a side plate 43SP rotatably attached thereto. An adjustment screw 43A may be disposed between side plate 43SP and top trunnion 43 to set the desired rotational end position of side plate 43SP relative to top trunnion 43. Preferably adjustment screw 43A is carried by side plate 43SP.

Side plate 43SP preferably, carries an inclined pin 43P which enters a channel 41C in trunnion body 41. An adjustment screw 41A may extend into channel 41C for contact with pin 43P. With such arrangement, as the user rotates top trunnion 43 towards trunnion body 41, pin 43P can contact adjustment screw 41A.

As pin 43P slides along adjustment screw 41A, it preferably rotates side plate 43SP about hinge 40H (and/or axis 40A) to a desired position, until top trunnion 43 contacts trunnion body 41 and/or adjustment screw 43A contacts top trunnion 43. Furthermore, as pin 43P slides along adjustment screw 41A, top trunnion 43 may rotate with side plate 43SP moving towards table 14. Persons skilled in the art will recognize that the arrangement of pin 43P and adjustment screws 41A and/or 43A assist in ensuring the alignment of and take up the play between the different elements of trunnion 40.

Figure 9C:
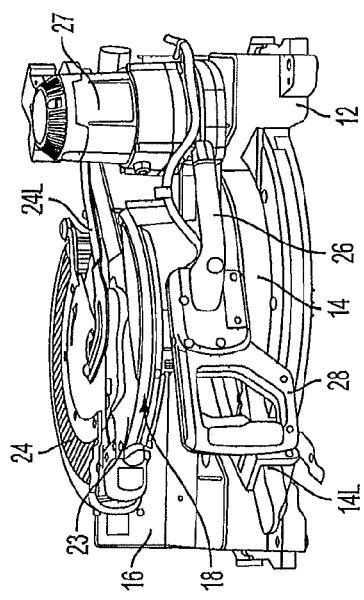
Figure 10A:
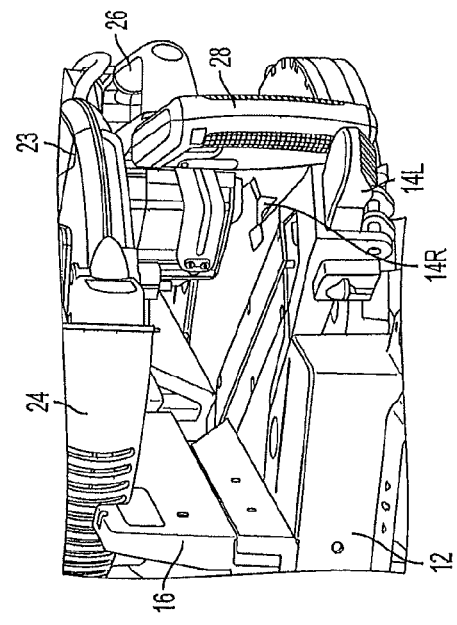
FIGS. 10A-10D illustrate the saw assembly latch, where

As discussed above, trunnion 40 allows a user to rotate saw assembly 18' from a position where the plane of blade 22 extends through table 14 for cutting (as shown in FIGS. 4A-4D) to a position where the plane of blade 22 does not extend through table 14 (as shown in FIGS. 9A-9C). The user can minimize the size of chop saw 100 by rotating saw assembly 18' about hinge 40H towards the position shown in FIGS. 9D-9F. Persons skilled in the art will note that lower guard 24 preferably remains in a position covering a portion of saw blade 22. This preferably occurs because a spring (not shown) disposed between lower guard 24 and upper guard 23 biases lower guard 24 towards the covering position. Lower guard 24 in turn pulls link 24L, which in turn causes side plate 43SP to rotate about hinge 40H.

Figure 9F:
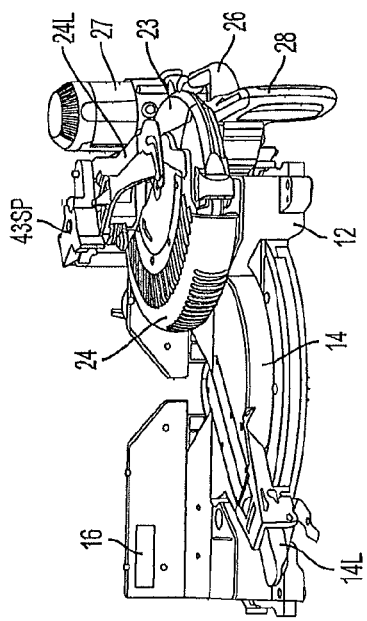
Figure 10B:
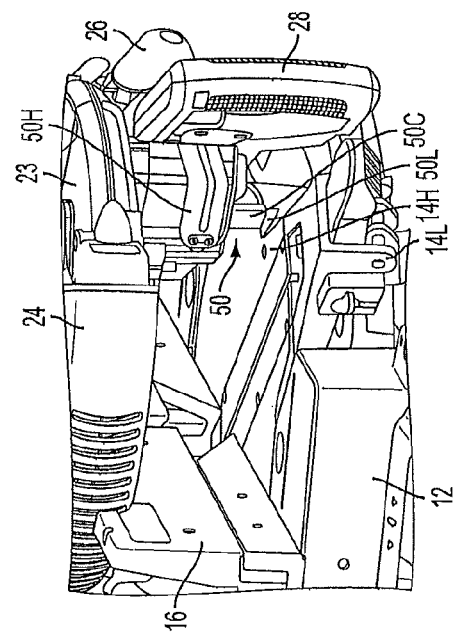
Figure 10D:
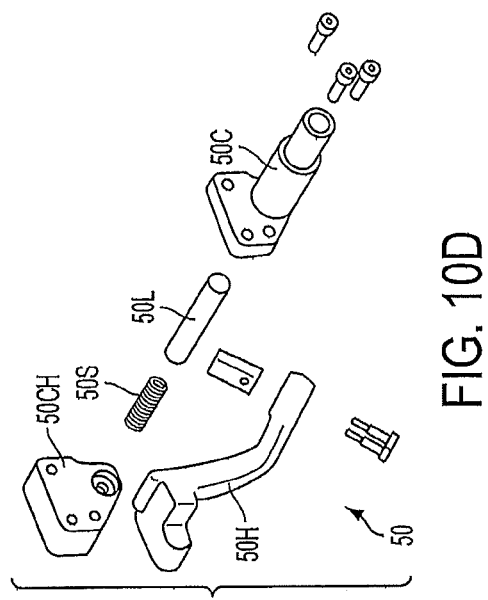
Figure 10C:
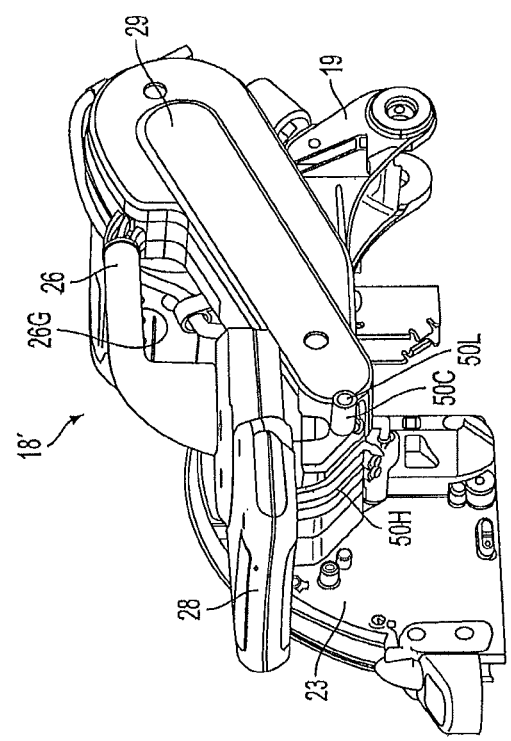

Referring to FIGS. 9-10, it is preferable to lock saw assembly 18' in the position of FIGS. 9D-9F. This can be accomplished by a storage latch assembly 50, which is carried on saw assembly 18', preferably adjacent to handle 28. Saw assembly 18' preferably has a housing 50CH connected to a holder 50C which carries a latch 50L. A spring 50S is preferably disposed between housing 50CH and latch 50L for biasing latch 50L towards a latching position.

A handle 50H may be disposed adjacent to handle 28. Handle 50H is preferably connected to latch 50L for moving latch 50L between a latched position and a retracted position.

As saw assembly 18' is rotated from the position shown in FIGS. 9A-9C towards the position of FIGS. 9D-9F, latch 50L can contact table 14. Preferably table 14 has a ramp 14R on which latch 50L slides thereon. As the user continues to rotate saw assembly 18', latch 50L will then rotate along the workpiece-supporting portion of table 14 until it enters a hole 14H disposed thereon. Because spring 50S provides a biasing force, latch 50L will enter hole 14H, locking the position of saw assembly 18'.

In order to return chop saw 100 to its operating position (shown in FIGS. 4A-4D), the user would move handle 50H, retracting latch 50L from hole 14H, allowing the user to rotate saw assembly 18' towards the position shown in FIGS. 9A-9C. The user would then rotate saw assembly 18' about hinge 40H (thus moving top trunnion 43 towards trunnion body 41).

Figure 3:
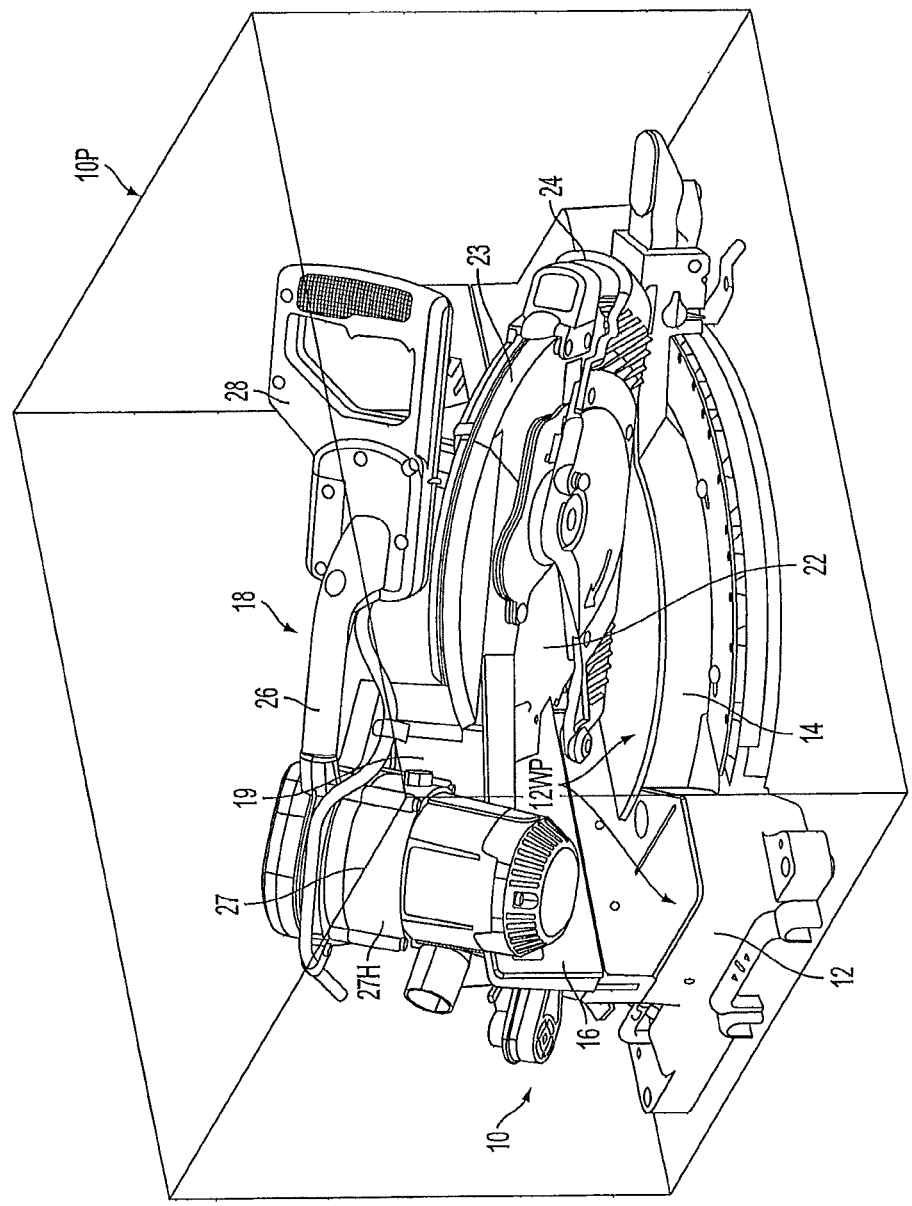
FIG. 3 is a perspective view of the prior art chop saw of FIG. 1 in a package.
Figure 4B:
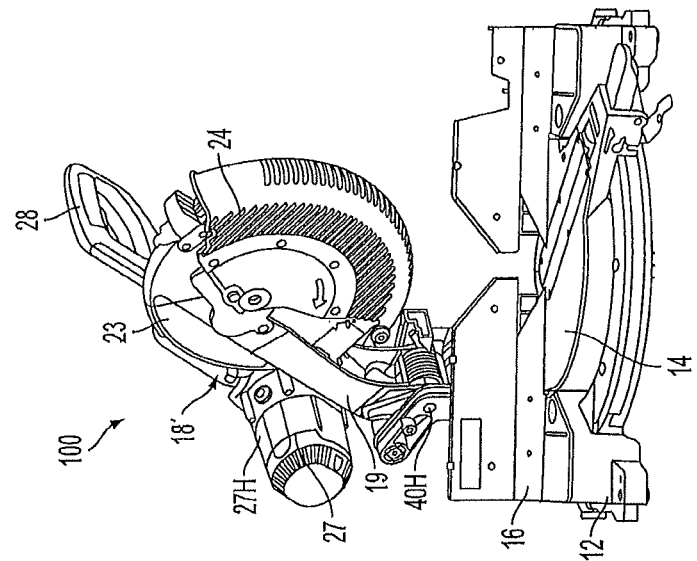
FIGS. 4A-4B are front perspective views of the chop saw with the table rotated in first and second positions, respectively.
Figure 4A:
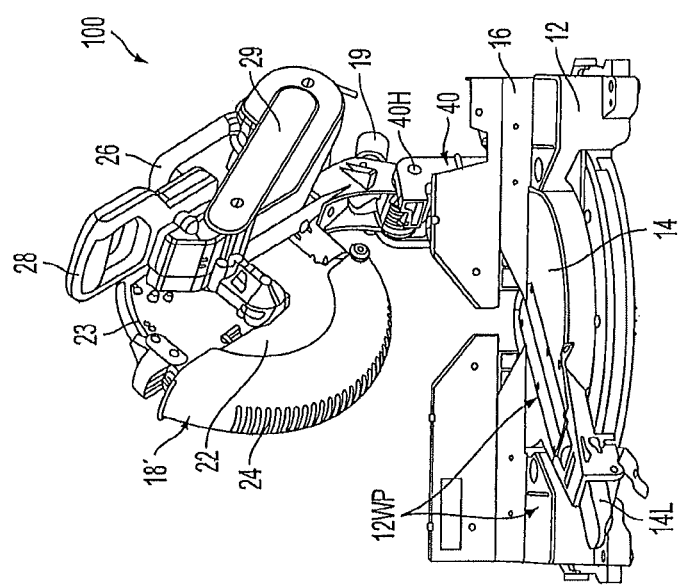
Figure 4C:
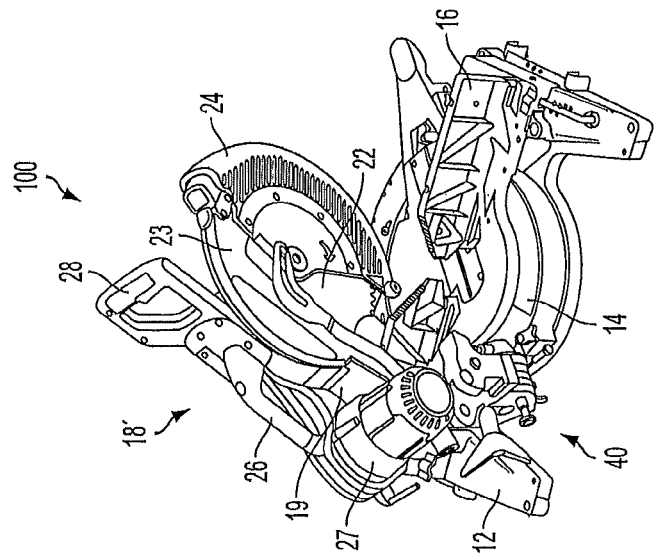
FIGS. 4C-4D are rear perspective views of the chop saw from two different angles.
Figure 4D:
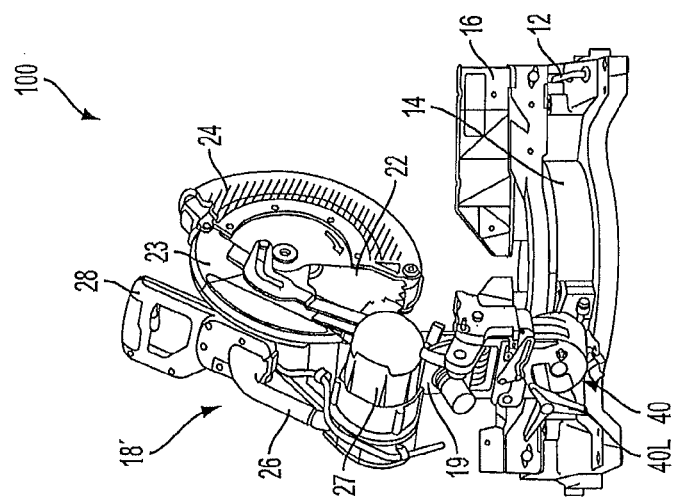
Figure 5A:
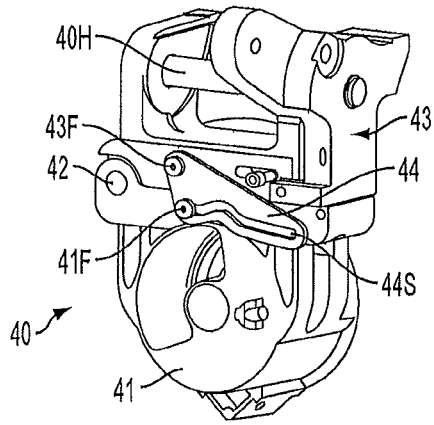
Figure 5B:
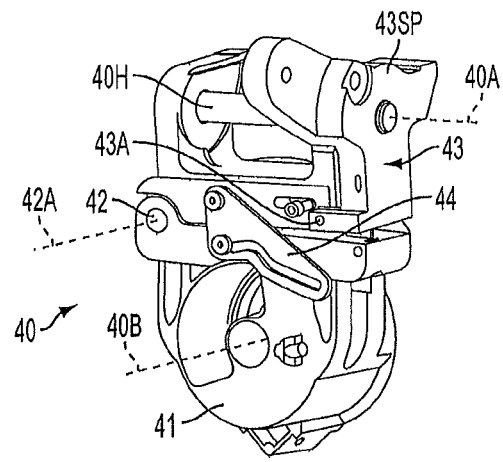
Figure 5C:
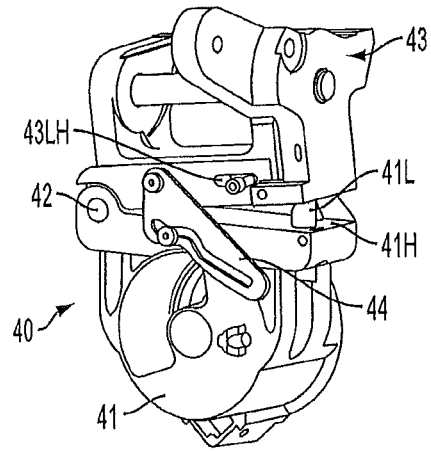
Figure 5D:
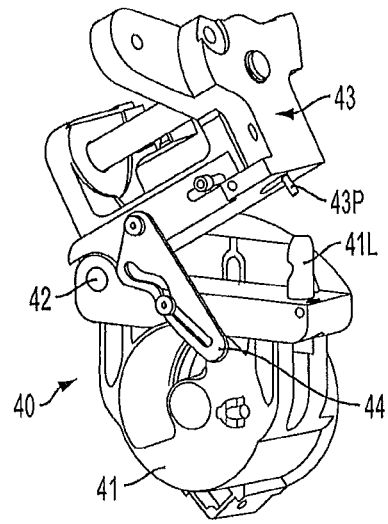

Persons skilled in the art will recognize that, in the position shown in FIGS. 9D-9F, a chop saw that carries a 12 inch (304.8 mm) blade would require a 660 mm×500 mm×325 mm (107,250 cubic centimeters) package or larger, compared to the 660 mm×570 mm×385 mm (144,837 cubic centimeters) package 10P of FIG. 3. Similarly, a chop saw 100 that carries a 10 inch (254 mm) blade would require a 550 mm×417 mm×271 mm (62,154 cubic centimeters) package or larger, compared to the 550 mm×475 mm×321 mm (83,861 cubic centimeters) package required for a prior art chop saw.

Figure 11A:
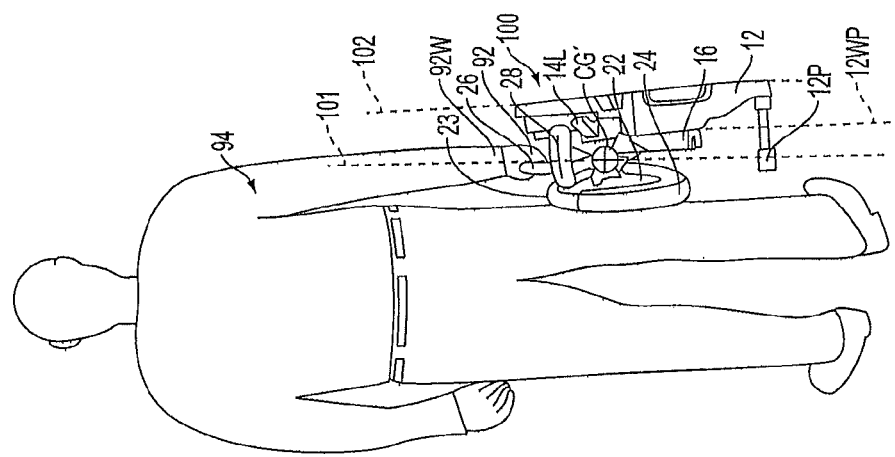
FIGS. 11A-11B illustrate a user transporting the chop saw in first and second transportation orientations, respectively.
Figure 11B:
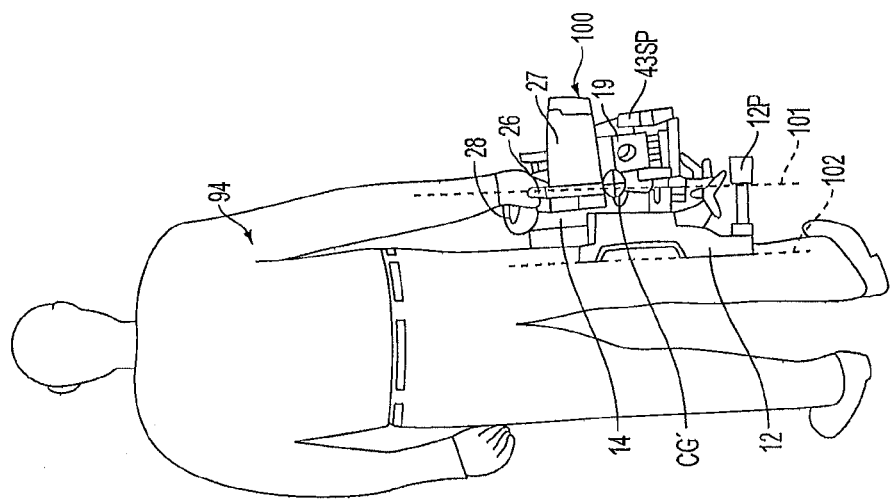

Referring to FIGS. 11A-11B, it may be preferable to attach posts 12P to base assembly 12. Preferably, the longitudinal axes of posts 12P are substantially parallel to the mitering axis and/or substantially perpendicular to the workpiece-supporting plane of base assembly 12 and/or table 14 (and to the blade plane, when saw assembly 18' is in the position of FIGS. 9A-9F). With such arrangement, the user can place a chop saw 100 on the floor in the orientation shown in FIGS. 11A-11B, i.e., with the workpiece-supporting plane of base assembly 12 and/or table 14 substantially perpendicular to the floor.

It is preferable that carrying handle 26 be configured to be gripped by a palmar surface of the hand 92 of a user 94 when the user 94 is transporting chop saw 100. Carrying handle 26 may have a grip portion 26G that is contoured to receive the fingers of the user 94 when the user 94 is transporting chop saw 100. Grip portion 26G is preferably formed about a center line that lies in (or is positionable into) a plane 101 that includes the center of gravity CG' of chop saw 100.

Persons skilled in the art will recognize that chop saw 100, when used for cutting a workpiece, will be disposed on a plane 102. Referring to FIG. 11A, since the center of gravity CG' is relative close to the plane 102, the user 94 is able to transport the chop saw 100 such that plane 102 is proximate a lateral side of the user 94 (i.e., within about 10 inches of the lateral side, and preferably about 3 inches to about 7 inches) and the user's wrist 92W is not in a state of flexion. With the carrying handle 26 so positioned, the user 94 is able to comfortably carry the chop saw 100. Persons skilled in the art will also recognize that the user can also transport chop saw 100 in the orientation shown in FIG. 11B, where the center of gravity CG' is disposed between plane 102 and the lateral side of the user.

The description of the invention 18 merely exemplary in nature and, thus, variations that do not depart from the gist of the invention are intended to be within the scope of the invention. Such variations are not to be regarded as a departure from the scope of the invention.

What is claimed is:

1. A chop saw comprising:
    a base assembly comprising a rotatable table having a workpiece-supporting plane;
    a saw assembly pivotally attached to the base assembly, the saw assembly having a blade having a blade plane and a motor driving the blade,
    a fence assembly connected to the base assembly,
    wherein a trunnion connects the rotatable table and the saw assembly allowing a user to rotate the saw assembly along a horizontal axis not below the workpiece-supporting plane, and allowing the user to rotate the saw assembly from a first position where the blade plane extends through the workpiece-supporting plane to a second position where the blade plane does not extend through the workpiece-supporting plane, wherein the saw assembly is lockable in the second position without requiring removal of a portion of the fence assembly.

2. The chop saw of claim 1, wherein the trunnion having a side trunnion hinge that allows the saw assembly to be pivoted between the first and second positions.

3. The chop saw of claim 2, wherein the saw assembly pivots about the side trunnion hinge about the axis, the saw assembly also pivoting about a bevel axis to change a bevel angle of the blade plane relative to the workpiece-supporting plane, the bevel axis being substantially parallel to the horizontal axis.

4. The chop saw of claim 3, wherein the chop saw is placeable in a package that has a volume of less than 144,837 cubic centimeters and less than 83,861 cubic centimeters if the blade has a diameter of 12 inches and 10 inches, respectively.

5. The chop saw of claim 4, wherein the package has a volume of at least about 107,250 cubic centimeters and at least 62,154 cubic centimeters if the blade has a diameter of 12 inches and 10 inches, respectively.

6. The chop saw of claim 3, wherein the saw assembly further comprises a lock assembly for locking the saw assembly in the second position.

7. The chop saw of claim 3, wherein the saw assembly has a carrying handle with a center line that is substantially co-planar with a center of gravity of the chop saw, when the saw assembly is in the second position and the workpiece-supporting plane is substantially vertical.

8. The chop saw of claim 7, wherein the base assembly defines a lower plane substantially parallel to the workpiece-supporting plane, the lower plane being substantially vertical when the saw assembly is disposed in the second position, the chop saw being carryable in a first orientation where the lower plane is disposed between the user and the plane including the center line of the carrying handle and the center of gravity.

9. The chop saw of claim 8, wherein the chop saw is carryable in a second orientation where the plane including the center line of the carrying handle and the center of gravity is disposed between the user and the lower plane.

10. The chop saw of claim 8, wherein the base assembly further comprises posts that are substantially perpendicular to at least one of the blade plane, the lower plane and the workpiece-supporting plane, the posts allowing the chop saw to remain in an orientation where the lower plane is substantially vertical.

\* \* \* \* \*